July 16, 1957     J. T. SCULLY     2,799,036
SELF-RETAINING BRUSH Filed Dec. 24, 1951     5 Sheets-Sheet 1

John T. Scully
INVENTOR.

July 16, 1957
J. T. SCULLY
2,799,036
SELF-RETAINING BRUSH
Filed Dec. 24, 1951
5 Sheets-Sheet 2

John J. Scully
INVENTOR.

July 16, 1957 J. T. SCULLY 2,799,036
SELF-RETAINING BRUSH
Filed Dec. 24, 1951 5 Sheets-Sheet 3

John T. Scully
INVENTOR.

July 16, 1957 J. T. SCULLY 2,799,036
SELF-RETAINING BRUSH
Filed Dec. 24, 1951 5 Sheets-Sheet 4

John J. Scully
INVENTOR.

United States Patent Office 2,799,036
Patented July 16, 1957

2,799,036

SELF-RETAINING BRUSH

John T. Scully, New York, N. Y.

Application December 24, 1951, Serial No. 263,059

21 Claims. (Cl. 15—143)

This invention relates to brushes generally and more particularly to short handle brushes which are manipulated by the handle in use as applicators, cleaners, dusters or the like and especially relates to brushes of the short handle type which can be stood up on end, bristles up, intermittently during the course of use and which, in actual use or operation, may be held by the user with the stand-up-on end of the brush received in the hand of the user.

Among the principal objectives of the invention are: the provision of a brush having generally improved means for hanging it on a common support, for example, a shelf in a household; the provision of a brush having improved means for clamping it to the shelf or the like and against accidental dislodgement of the brush therefrom; the provision of a brush having the improved means and which means may be easily and conveniently manipulated into operative position by the user; the provision of a brush having the improved hanging or clamping means adjustably mounted for engaging supports of various thicknesses or shapes; the provision of a brush having hanging or clamping means seated on the handle which will not interfere with the handling of the brush, nor inconvenience the grip of the user, nor irritate the hand as the brush is being manipulated in its use and which means may be quickly moved into operative position for hanging or clamping the brush and which when released from operative position will be automatically returned to its seat on the handle; to provide a brush having such means which are efficient and positive in operation, durable against accidental breakage, shape distortion or other similar damage and which, if desired, may be of economical construction and ease of manufacture; the provision of a brush which may be stood up on end, bristles up and wet or wet and soapy, for intermittent use during the applying or cleaning operations and which, thereafter, may be hung, bristles down, for proper drying, upon a common household shelf, or the like, with the handle and bristles of the brush beneath the shelf for space economy and minimum interference with other objects which may be on the shelf and which brush may be rapidly disengaged from the shelf for use; to provide the brush in a form, preferably, whereby, in its standing, bristles up, position, it will be substantially normal or perpendicular to the shelf to avoid or minimize sidewise dripping from the formation of bristles of water or lather or the like and whereby, in its hanging, bristles down, position, it will be substantially normal or perpendicular to the shelf for proper draining and drying of the bristles; and the provision of a brush having improved hanging means in the form of a clamping member cooperative with the stand-up-on end of the brush or, more precisely, the stand-up-on end face, for clamping the brush securely, in either its standing up or hanging down position, to the shelf or the like commonly found in a household or to a suitable support for packaging the brush for its travel or to a suitable support found in the rooms of ships or trains in which the user may be travelling.

These and other objects will be apparent from the description taken in connection with the accompanying drawing, and in which:

Fig. 28A is an enlarged fragmentary view of details of parts shown in Fig. 28.

As is well known, brushes vary greatly as to construction, size, shape and relative dimensions of parts according, more or less, to the use to which they are to be put either in a wet or dry condition of the bristles or equivalent filaments and in the manner and parts in which they are usually gripped by the user in performing the work for which a brush is used. In work of various kind, a brush is frequently employed intermittently in the course of the performance of the work, that is, is used, momentarily put aside, re-used and momentarily put aside again within reaching distance until the work is finished and the brush then put out of the way. The nature of the work, in some instances, requires the bristles to be wet or become wet and, in some instances, the work is best performed by a relatively short brush in order that the user may use the brush held substantially normal or perpendicular to the surface of the object on which the brush is being used and, in order to properly grip the brush, under these circumstances, it is often necessary for the user to palm one end of the brush as he holds the brush in the grip of his hand to manipulate the brush on the work. In the intermittent use of a wet brush, it is not only convenient, but, also, desirable to stand the brush momentarily aside up on its end, the end which the user usually receives in the palm of his hand in using the brush, to avoid drippings from the bristles wetting parts of the external support upon which the brush is placed. After the work is finished, it is desirable to hang up the brush with its wet bristles down for proper drainage and quicker drying to prolong or preserve the useful life of the brush.

In the prior art, numerous means have been taught for hanging a brush such as hooking it on the rim of a can or fastening it atop of a can by a spring clip arrangement and it is common practice to screw an eyescrew into a brush on the end of the handle to hang the brush on a nail or hook or to provide a whiskbroom, floor broom, mop or the like, with a hanger ring, each and all having the advantages peculiar to the construction, size, shape, relative dimensions of parts, relative locations of parts, usage and state of the bristles or equivalent filaments and the manner in which the brushes are to be gripped and the parts to be gripped.

For purposes of illustration, but not by way of limitation, the present invention is shown herein as embodied in a brush in which the bristles are employed in the work in a wet or soapy state or condition, intermittently employed in the course of the work, in which the brush is stood up on end during the intermissions, in which the user palms the end of the brush in manipulating the brush in the work and in a brush, which during the manipulations in the work, is usually held substantially normal or perpendicular to the surface on which the bristles are working. Examples of such a brush are presented in the form of a shaving brush and a pan or pot bottom cleaning or scouring brush; the shaving brush being illustrative as a brush intermittently used in a soapy condition, in the course of a shave, for occasional re-lathering of areas of the face and which is stood up on its end between the re-lathering applications and which, after rinsing of the bristles should be hung, bristles down, for proper drainage and quick drying; the pan or pot brush being illustrative of a cleaning brush intermittently used in the course of cleaning successively several pans or pots or the like.

Figure 1:
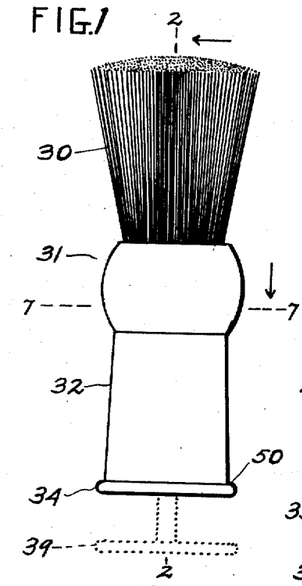
Fig. 1 is a side elevation of a brush embodying the invention in one form.
Figure 2:
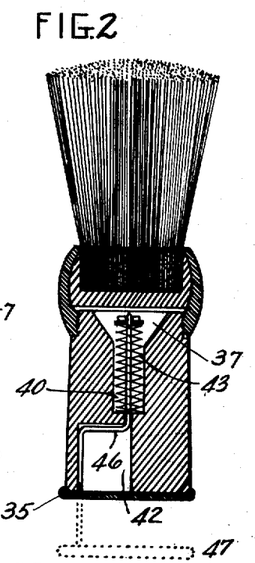
Fig. 2 is a longitudinal sectional view of the brush handle taken on the line 2—2 of Fig. 1 with parts shown in elevation and the brush axially rotated 90 degrees.

Referring to the drawing in more detail and in which similar reference characters refer to similar or corresponding parts throughout the several views:

The shaving brush shown in Figs. 1–7 inclusive comprises a formation of suitable bristles 30 secured in the ferrule portion 31 of the handle 32. The bristles may be secured in the brush in any suitable and well known manner and, as shown herein, are preferably set in or bonded together, at their inner marginal ends, in rubber to form the bristle knot and the knot of bristles held in a cup-like retainer of plastic material, unaffected by hot or cold water, which, in turn, is adhered to the inner wall of the tubular ferrule portion of the handle, all according to one of the best and well known practices in the shaving brush art. The portions of the handle are threadedly connected together as at 33 and may be permanently cemented to each other in which case the engaging threads serve to provide increased surfaces on each to strengthen the bond by the cement, or, if desired, the handle parts may be detachable in which case the threads will serve as screw threads for detachable connection of the handle portions. At its outer end, handle 32 is provided with an adjustable brush hanging or clamping member, generally designated, 34 which serves as a brush hanging-hook or brush clamping-hook to hang or to hang and clamp the brush to an external support. At its outer end, member 34 comprises or is in the form of a circular, flat-bottom plate 35 disposed substantially rectangularly transverse to the axis of the handle which is substantially coaxial with the brush as a whole and which plate 35 is larger in diameter than the outer end of the handle and has a dished out or cupped inner face from which, at a region between the center and the peripheral edge of the plate, a plate supporting-arm 36, formed integral with the plate as by casting or molding, projects into a longitudinal bore 37 in the handle and in which member 36 is longitudinal movable to space and to adjustably space plate 35 longitudinally outwardly of or from the outer end face 38 of the handle, as indicated by the dotted outlines (Figs. 1 and 2). The side edges of 36 are transversely rounded and bore 37 has a cylindrical portion 40 which is coaxially disposed relatively to the handle and is outwardly flared at the inner end of the handle; a rectangular and relatively narrower intermediate portion 41 of the bore is likewise coaxially disposed and connects 40 to the relatively large rectangularly shaped, slot-like portion 42 of the bore and which extends into the outer end face of the handle and extends sidewise in the handle in the radial direction. Member 34 is suitably stiff or rigid throughout for shape retention in its function or functions and member or portion 36 is formed with two opposite angular bends as will be clearly seen upon reference to Figs. 2 and 5. Because of the relative difference in size between bore portions 40 and 41, there is formed at their junction an annular wall shoulder or abutment against which an end of a helical compression spring 43, which surrounds the longitudinally and centrally extending portion of 36, bears while the opposite end of the spring bears against a washer-like plate 44, the peripheral edge of which is, preferably, rounded transversely and which plate has a centrally disposed, rectangular opening or slot receiving the inner end of 36 and on which it is fastened and backed by suitable means, such as the cotter pin 45 extending transversely of 36 through a hole therein adjacent the extreme inner end thereof. Preferably, the external diameter of the spring is suitably less than the diameter of bore portion 40 to minimize frictional contact therein between the coils of the spring and the peripheral wall of 40 and at the same time to suitably guide the coils as the spring becomes further compressed; in some instances, the internal diameter of the spring may be small enough to enable member 36 alone to longitudinally guide the spring, and the diameter of bore portion 40 large enough relative to the external diameter of the spring so as to avoid peripheral contact of the spring coils with the peripheral wall of 40; the external diameter of the spring is suitably less than the diameter of 44 to avoid side slide over the peripheral edge thereof; the diameter of plate 44 is, preferably, but not necessarily, only slightly less than the diameter of bore portion 40 for the purpose of cooperating with the peripheral wall of 40 to provide guiding means for guiding longitudinal movement of member 34; additional guiding means for 34 are provided by the rectangular walls of intermediate bore portion 41. Extending, in the handle, in bore portion 42 and rectangularly transverse to the spring surrounded portion of 36 is a transverse portion 46 which is always spaced from the bottom wall of 42 and from portion 46, member 36 extends, longitudinally parallel to and transversely offset to the spring surrounded portion, out to 35. Member 36 is also guided by the side walls of 42. Member 35 is provided with an external annular flange or bead 47 for the brush user's fingers to grip and pull, or push, when it is desired to move 34 longitudinally outwardly into operative hanging or clamping position and on its inner side member 35 is provided with an outwardly flared or bevelled faced internal annular rim wall 48 which seats on a complementarily flared or bevelled faced external annular wall seat 49 on the outer end of the conically tapered portion of handle 32 and with the end face of the handle slightly spaced from the flat sunken or depressed inner face of 35. The outer face 51 of 35 is flat and serves as the stand-up-on end face of the brush upon which the brush may stand, bristles up, on a suitable support. The dished out or cupped inner face of the plate 35, and the similar inner face of the plate 35e of Fig. 24, extending substantially to all sides of the handle serve to close the bore portion 42 to prevent entrance of water into the bore portion which might without the closure drip upon the user's hand.

Figure 3:
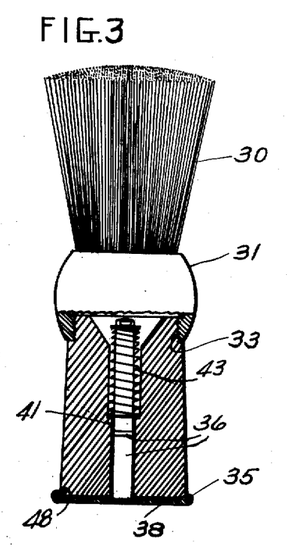
Fig. 3 is a fragmentary longitudinal sectional view, with parts in elevation, of the brush shown in Fig. 1 axially rotated 180 degrees from its position in Fig. 1 and 90 degrees from its position in Fig. 2.

Spring 43 is initially under sufficient tension to releasably retain member 35 firmly on its seat at the outer end of the handle and tends to further wedge the seat walls tighter together, thereby avoiding or minimizing any tendency to relative rotation of the handle and member 34 which is not otherwise avoided or minimized by the side walls of the longitudinal bore and this tendency to such rotation is, it will be understood, if it occurs at all, most likely to occur as the user manipulates the brush in lathering his face. Further, the initial tension of the spring avoids noise or rattle of the parts as the brush is shaken after rinsing to shake excess moisture from the bristles. Member 35, on its seat, closes or seals off the outer end of the longitudinal bore against water or soap lather seepage thereinto. Consequently, it will be clear, as I have found, that, with the parts in the positions as shown in Figs. 1, 2 and 3, the brush can be manipulated in use in the same manner as the common shaving brush and without any interference with the user's grip or irritation to his hand. It will also be clear that the flat outer face 51 of member 34 permits the brush to stand on that end, bristles up, on any suitable, available external support such as a window sill, wash basin, bathroom or other shelf commonly found in households and, in Fig. 4, I show the brush standing, bristles up, on its stand-up-on end face on a common glass shelf 52 attached by common wall brackets 53 to the tile wall 54 of a bathroom, the brush standing substantially vertical or perpendicular to the shelf.

Figures 4, 5, 6, 7, 8:
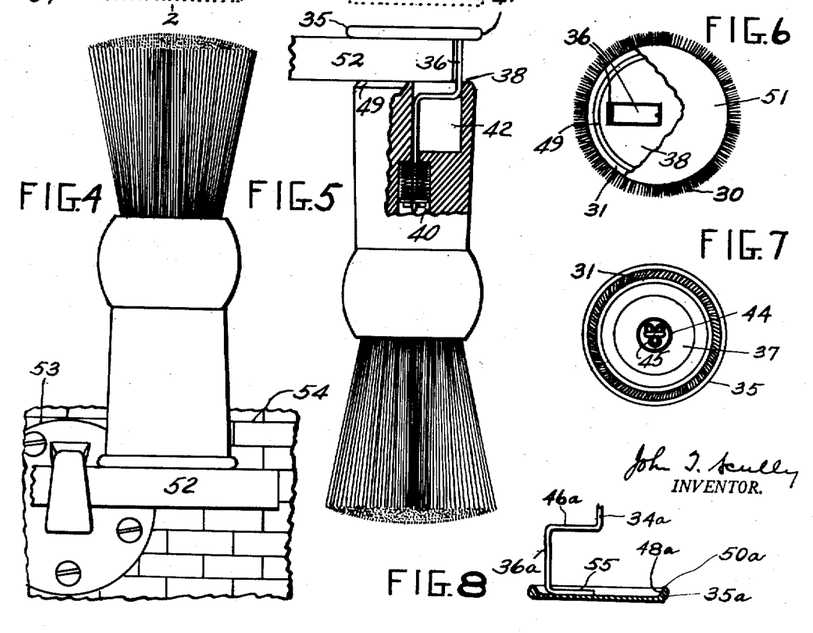
Fig. 4 is a side elevation of the brush shown in Fig. 1 standing, bristles up, upon a common household shelf.
Fig. 5 is a view of the same brush hanging, bristles down, clamped to the shelf and with part of the handle broken away to show parts in section and other parts in elevation and in a changed position from Figs. 2 and 3.
Fig. 6 is an end view of the brush with a part broken away to show inner parts in elevation and in section, the view looking at the stand-up-on end face of the brush.
Fig. 7 is a sectional view taken on line 7—7 of Fig. 1.
Fig. 8 is a side view, partly in section and partly in elevation of a modification in construction of a part.
Figure 9:
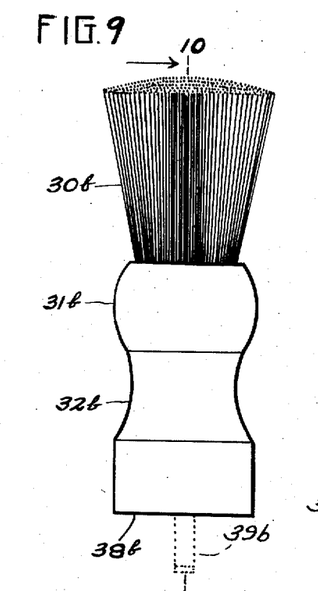
Fig. 9 is a side view of a further modification of brush.

To hang the brush, after use, the user will, with his fingers engaging the bead 47 of 35, move the member 34 longitudinally outwardly to space 35 longitudinally away from the outer end face 38 of the handle and hang the brush, bristles down, clamped to the shelf, as shown in Fig. 5, and in which, it will be observed, end face 38 of the handle and hanger or clamp edge or face 50 of 35 cooperate in the clamping action. The extent to which spring 43 is shown compressed in Fig. 5 is less than full compression and, therefore, the brush can be clamped to a thicker, as well as a thinner, support than the shelf 52; the spring, when fully compressed, serves to stop outward movement of 34 and this outward movement is stopped before transverse portion 46 would, otherwise, emerge from bore portion 42. It will be obvious that the construction of inner dished out face of 35 permits the brush to be hung upon or clamped to the head of a nail or the end of a common hook, such as a cup hanging hook.

It will be understood that, since the brush and its modifications shown herein are, in use, to become wet in other regions as well as in the region of the bristles, such parts as are most suitably made of metal will be either of inherently rust resisting metal or metals, for example, stainless steel or brass, or the like, or will be coated by a plating of rust resisting material, for example, nickel or chrome.

In the modification of parts shown in Fig. 8, brush hanging or clamping member 34a is manufactured in two parts of steel, 34a and 35a. Supporting arm extension 36a has an extension 55 parallel to transverse portion 46a and which is spot welded to the inner, dished out face of 35a; in other respects, member 34a is similar to, and for similar function, as member 34 previously shown and described.

Figures 10, 11, 14:
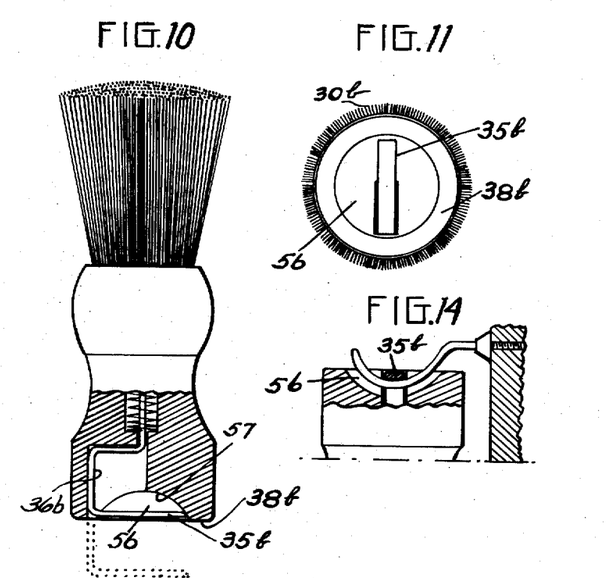
Fig. 10 is a side elevation of the brush shown in Fig. 9 with a part broken away to show parts in elevation and in section, the section being taken on the line 10—10 of Fig. 9.
Fig. 11 is an end view of the brush shown in Fig. 9 turned upside down, the view looking at the stand-up-on end face of the brush.
Fig. 14 is a fragmentary side view, with a part broken away and shown in section and other parts in elevation, of the brush shown in Fig. 9 hanging, bristles down, from a common wall hook.
Figure 12:
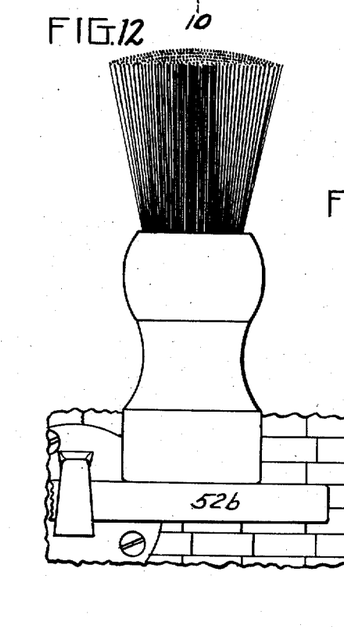
Fig. 12 is a side elevation of the brush shown in Fig. 9 standing up on its stand-up-on end face upon a common household shelf similar to the shelf shown in Fig. 4.
Figure 13:
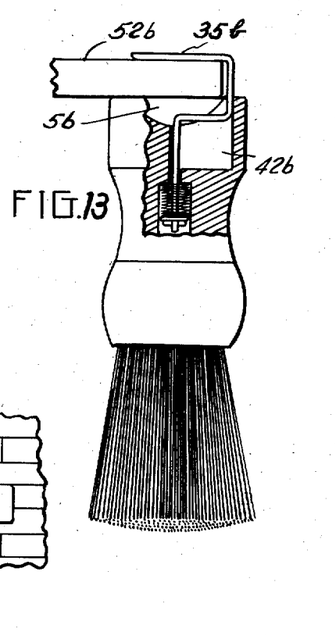
Fig. 13 is a view of the brush shown in Fig. 12 hanging, bristles down, clamped to the shelf and with part of the handle broken away to show parts in section and parts in elevation and changed position from Fig. 10.

The shaving brush shown in Figs. 9–14 inclusive, in addition to the difference in shape and external appearance of the handle 32b, differs from the brush shown in Figs. 1–7 inclusive in the following respects: The brush hanging or clamping member has, in lieu of the circular, cap-like plate, at its outer end an extension 35b directed transversely of the axis of the brush handle which is normally seated in a dome-like recess or depression 56 with its outer end releasably held in firm engagement with the spherically concavely curved wall 57, formed in the handle by 56, by the tension of the compression spring. The outer end face of the handle, designated 38b, is flat and serves as the stand-up-on end face of this brush and the bowl-like depression 56 is both wide enough and deep enough to accommodate or receive the tips of the user's thumb and forefinger to engage at least partially beneath 35b to seize it and draw the hanging or clamping member out into operative position. For the relative difference in the positions of portion 35b and 34 (Figs. 1, 2 and 3) to the handles compensation is made by a slight increase in the length of 32b or a change in proportions of other pertinent parts. Instead of being clamped, bristles down, to the shelf, as shown in Fig. 13, this brush may, also, be hung upon a common wall hook as shown in Fig. 14. I have found, in repeated use of this brush, that such water or soap lather that may enter the open ended longitudinal bore is, more or less automatically, washed and shaken out in the rinsing and shaking of the brush after use and, therefore, appears in no way objectionable. In other respects, this brush is similar to the brush shown in Figs. 1–7 and described in connection therewith.

Figure 15:
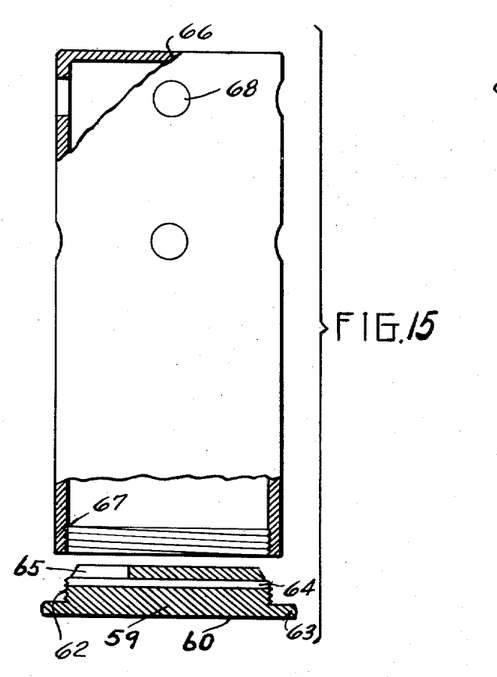
Fig. 15 is a side view, partly in elevation and partly in section, of a portable external support and casing for the brush shown in Figs. 9–14.
Figure 16:
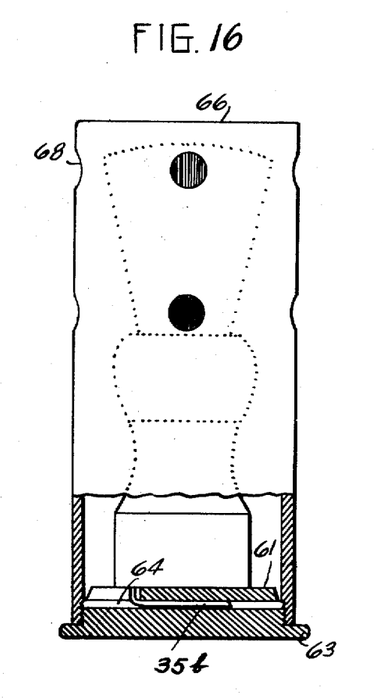
Fig. 16 is a side view of the parts shown in Fig. 15 detachably connected together and with the brush of Fig. 9 housed therein and clamped to a part.
Figure 17:
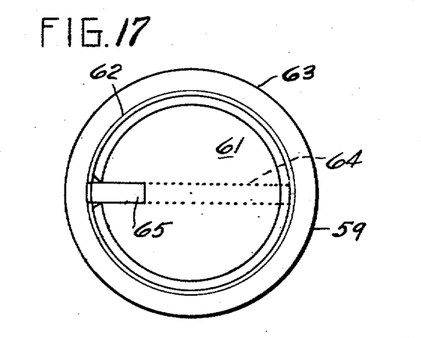
Fig. 17 is a view of the inner face of a part shown in section in Fig. 15.
Figure 18:
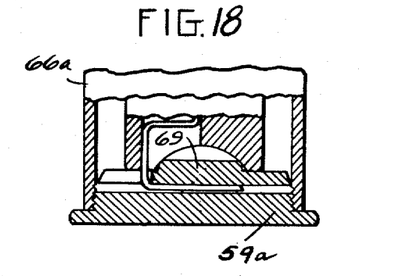
Fig. 18 is a fragmentary side view, partly in elevation and section illustrating a modification of a part shown in Fig. 16.
Figure 19:
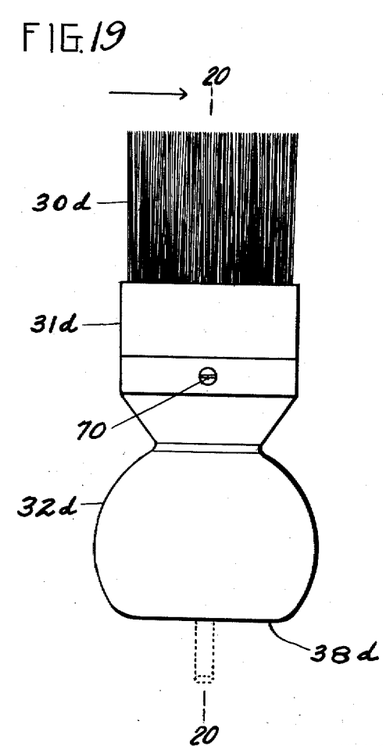
Fig. 19 is a side elevation of a further modification of brush.
Figure 20:
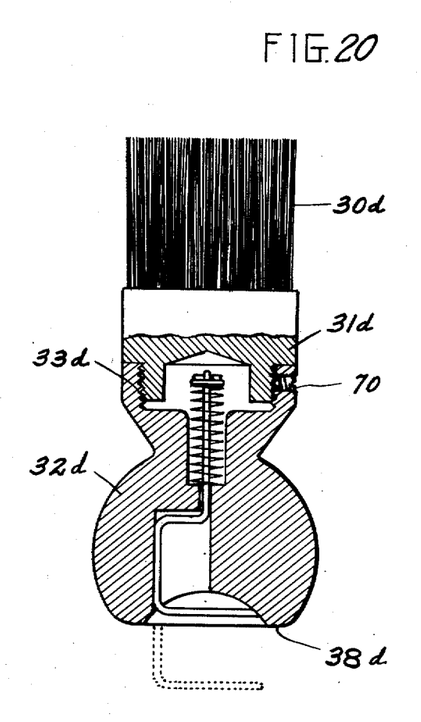
Fig. 20 is a side view of the brush shown in Fig. 19 axially turned 90 degrees from reader's left to right and with a part broken away and shown partly in section, with a part shown in section and inner parts in elevation; the section being taken on the line 20—20 of Fig. 19.
Figure 21:
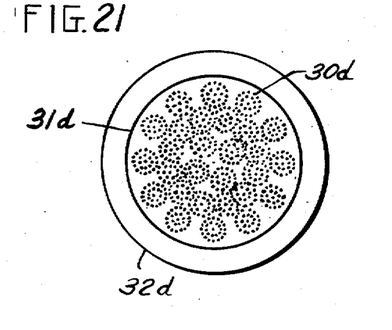
Fig. 21 is a top or bristle end view of the brush shown in Figs. 19 and 20.
Figure 22:
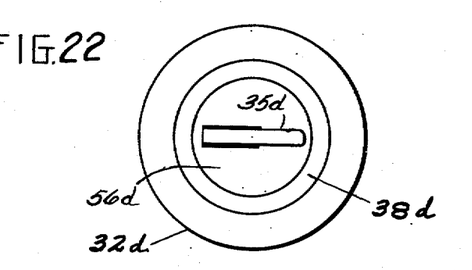
Fig. 22 is a bottom end view of the brush shown in Fig. 19, the view looking at the stand-up-on end face of the brush.

The brush shown in Figs. 9–14 inclusive may be clamped to a portable external support to provide a base which is relatively wider than the width of the stand-up-on end face of the brush to stand the brush, bristles up, on a wash basin or the like in a moving train or ship to minimize the risk of the brush being toppled over by the lurching of train or ship and this portable support may be in the form of an end closure for a brush container for carrying the brush during travel or shipping or, when of transparent material for commercial display of the brush. In Figs. 15–17 inclusive, portable external support 59 comprises a generally cylindrical plate or closure plug, of any suitable material, having a flat base or bottom 60 and flat top 61 and, disposed therebetween, an intermediate cylindrical portion having peripheral screw threads 62. Adjacent the bottom of the threaded portion, member 59 is provided with an annular flange 63; adjacent the top of the threaded portion, member 59 is provided with a diametrically directed slot 64. Cemented, or otherwise secured in any suitable manner, to the upper face of the threaded portion is a circular plate having a relatively short, radial slot 65 in registration with a marginal end of slot 64 and which, at its outer end, is slightly flared in a direction transverse to its length. This circular plate is of smaller diameter than the peripherally threaded intermediate portion of 59 and has its peripheral edge bevelled to taper the plate in width down from the top flat face 61 and is cemented to 59 in a position in which the peripheral edge of the plate lies within the plane of 62. The brush may be clamped to 59 by partially withdrawing 35b outwardly and inserting its hook-like end down through 65 and into 64 approximately as far as 35b can go before being stopped by the end wall of 65 and in which position it will be, that is the brush, approximately centered on support 59. Member 59, as shown herein, may also serve as a bottom closure for a hollow cylindrical casing 66 being internally threaded, as at 67, at its open end for cooperative screw thread engagement with 62 of 59 to form a brush container for travel, shipping or display of the brush. A number of holes or air vents 68 may be provided in 66, preferably in locations which will be radially opposite the bristles of the brush. In some instances, the portable support and end closure may be presented in the form shown in Fig. 20 wherein, in its central region, the top face of 59a is provided with a circular bulge 69 to engage into the dome-like recess in the outer end of the brush handle and to cooperate with the spherically concave wall therein to secure the brush in position on 59a against being accidentally jarred to one side while in transit. To remove the brush from 59a, it is necessary to first remove 66a, then lift the brush handle to clear 69 and then move the brush laterally relatively to 59a to slide the hanger hook out of the slot.

The brush shown in Figs. 19–22 inclusive differs, in addition to the shape and general appearance of its partly cylindrical and partly bulbous handle, from the brush shown in Figs. 9–14 inclusive, in that the bristles 30d, which may be any suitable filaments, are in a formation of tufts, the tufts being stapled, in the well known manner, in sockets in the cylindrical block portion 31d of the handle 32d, the handle parts being detachably screwed together as at 33d whereby 30d and 31d may be replaced from time to time as a result of hard usage when presented in the form of a pan or pot cleaning or scouring brush having wire or other bristles suitable for such work. With such work in view, a pointed set screw 70 is provided in the handle for screwing into the threaded side of 31d to serve to lock the parts and especially after the threads of the portion of the handle which carries the brush hanging-hook have become worn after repeated replacement of 31d. The transversely slotted or outer end of screw 70 is, when the screw is in locking position, within the screw hole to avoid irritation to the user's hand. The outer end face of the handle is flat and provides the stand-up-on end face 38d of the brush.

Figures 23, 24, 25, 26, 27, 28, 29, 30, 31, 32, 33:
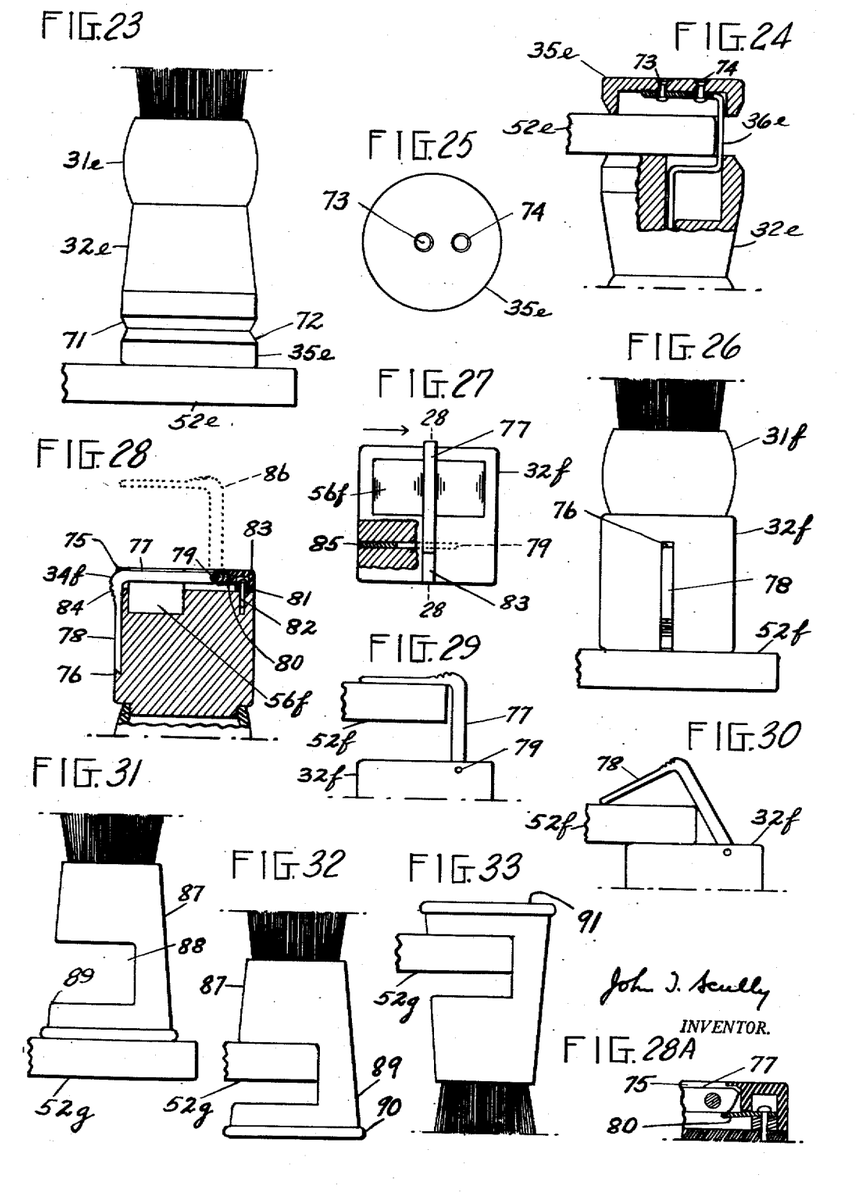
Fig. 23 is a fragmentary side view of a further modification of brush shown standing, bristles up, on its stand-up-on end face on a shelf similar to the shelf of Fig. 4.
Fig. 24 is a partly elevational and partly sectional view of the brush shown in Fig. 23 hanging, bristles down, clamped to the shelf.
Fig. 25 is a bottom end view of the brush shown in Fig. 23, the view looking at the stand-up-on end face of the brush.
Fig. 26 is a fragmentary side view of a further modification of brush shown standing, bristles up, on its stand-up-on end face on the shelf.
Fig. 27 is a bottom end view of the brush shown in Fig. 26, the view looking at the stand-upon end face of the brush and with the end face shown partly broken through to show the location of inner parts.
Fig. 28 is a secional view taken on the line 28—28 of Fig. 27 with parts shown in elevation.
Fig. 29 is a fragmentary side view of the brush shown in Fig. 26 hanging, bristles down, from the shelf.
Fig. 30 is a similar side view, but with the brush shown clamped to the shelf.
Fig. 31 is a fragmentary side elevation of a further modification of brush shown standing, bristles up, on its stand-up-on end face on the shelf.
Fig. 32 is a side view of the brush shown in Fig. 31 hanging on the shelf, bristles up.
Fig. 33 is a side view of the brush shown in Fig. 31 hanging on the shelf, bristles down.

The shaving brush shown in Figs. 23, 24 and 25 has its brush hanging-hook or brush clamping-hook member provided at its outer end with a circular plate 35e suitable to present the appearance of a mere extension longitudinally of the handle 32e. The outer end of the handle is peripherally bevelled or inclined inwardly as at 71 to form, together with the peripherally bevelled or inclined side portion 72 of 35e an annular groove of sufficient width and depth to facilitate the outward manipulation of the brush hanging-hook member by the fingers of the user. Also, because the annular groove makes unobjectionable any slight relative lateral displacement of 32e and 35e, the fit of 36e, in manufacture, may, in some instances, be loose enough in the longitudinal bore of the handle to enable the user, with the thumb and forefinger of his brush holding hand, to push 35e freely outwardly of the handle without pushing it too precisely in the axial direction of the handle. The inner face of 35e is hollow or dished out and receives an end extension of supporting arm 36e and this end extension is secured to 35e along a diametric center thereof by rivets headed down in the holes 74 of 35e. The outer end face of 35e, which may be observed in Fig. 25, is flat and constitutes the stand-up-on end face of the brush on which it is shown standing upon the shelf 52e in Fig. 23. It will be noted from Fig. 24 that the hollow face of 35e does not receive the outer end of the handle as occurs with the corresponding parts of the brush shown in Figs. 2 and 3 and, since the recess of the hollow inner face of 35e is deeper than the recess of 35a in Fig. 8, the length of the handle 32e and the depth of the radial slot portion of the longitudinal bore are somewhat less, being reduced inwardly from their outer ends, than the corresponding parts shown in Figs. 1–7 and modified as in Fig. 8, and the distance between the parts of 36e which correspond to the parts 46a and 55 of Fig. 8 is somewhat increased. In other respects, the brush shown in Figs. 23–25 inclusive is of similar construction and function of parts as the brush shown in Figs. 1–7, modified as in Fig. 8.

The shaving brush shown in Figs. 28–32 inclusive is provided with a handle 32f having a block shaped portion provided with a circular end received in the tubular ferrule portion 31f and cemented to the inner wall of 31f and with the result that the portion of the block not in the ferrule portion is substantially square. In the end face of the block opposite to the referred to circular end, which end face is the stand-up-on end face of the brush, is formed a channel 75, of rectangular shape in cross-section, which extends centrally across the block on opposite sides of a relatively deeper and wider recess 56f which is concavely curved in a direction rectangularly transverse to the lengthwise direction of the channel 75. From a region spaced a short distance from the ferrule portion of the handle and in one of the side faces of the block is a relatively shallower channel, also of rectangular shape in cross-section, indicated by 76, extending on the side face of the block centrally outwardly toward the end face of the brush to merge with an outer end of channel 75, the channels 75 and 76 providing, in effect, a continuous channel extending across the end face and up the side face perpendicular to the end face. Received in this channel, or channels, is an adjustably positioned brush hanging-hook or brush clamping-hook member 34f, in the form of a rectangularly bent bar, having a relatively thick bar portion 77 of substantially square cross-section positioned lengthwise in channel 75 slightly spaced inwardly, or down in the channel, from the outer end face of the block and more greatly spaced upwardly from the bottom wall of channel 75 and in which it bridges centrally over the dished out recess 56f. At a right angle to 77 and received lengthwise in channel 76 with its outer face substantially flush with the adjacent side face of the block, is a generally rectangularly shaped portion 78, of 34f, which is relatively thinner than 77. Member 34f is pivotally mounted in 32f for longitudinally outward movement relatively to the brush handle on a pin 79 which extends in the block through the inner end of 77 substantially centrally of its thickness and transversely of 77 from opposite sides of channel 75 and, axially, this inner end of 77 extends inwardly of or beyond the axis of cylindrical pin 79 a distance which is slightly in excess of the thickness of 77; the end face of this inner end of 77 is inclined on a continuously upward and rearward curve which extends from the bottom face of 77 to within a very short distance of its opposite or top face where, for the remaining distance, the end face of 77 is flattened off to provide a very short, flat end face inclined in the opposite direction to the curved end face portion. With its outer end in surface engagement with the inner end of 77 (see Fig. 30A) and held flexed and under tension thereby, is a leaf spring 80 disposed in channel 75 and mounted therein on a rectangular spacer 81. A drive screw 82, or other suitable fastener, extending through the spring and spacer secures them in position. The end of the channel, adjacent the spring and spacer is closed by a plug 83 which covers the spacer, the head of 82 and a part of the spring and the plug is cemented to the side walls of the channel, or it may be fastened to the block by any other suitable and well known means. Plug 83 has a thin extension extending in the channel 75 and slightly spaced from and opposite the top face of 77, as will be observed upon reference to Fig. 28A especially, and this extension serves to limit the pivotal movement of 34f to an elevation of approximately 90 degrees or to the position shown by the dotted outline 86 in Fig. 28 or in solid line in Fig. 29 and in which position the extension serves as a stop by virtue of its engagement with 77. Before being positioned in the channel in manufacture of the brush, spring 80 is, initially, a flat, rectangular spring and it is positioned and fastened in the channel with its side edges spaced from the channel walls and, thereafter, is at all times held under tension by its engagement with 77 of 34f being flexed thereby on the edge of the spacer serving as a fulcrum edge and the spring serves not only to resiliently hold member 34f seated in the block with bar portion 78 against the bottom wall of channel 76, but, also, serves to resist outward movement of 34f, always tending to return or retract member 34f to its seat in the block until the outward movement has caused 34f to reach an elevation, for example 80 degrees, at which the inclined curved portion of the inner end face of 77 will have completed its travel on the face of the spring and at this approximate elevation member 34f ceases to operate as a brush clamping-hook cooperative with the end face of the block to clamp the brush to an external support. As the short, flat face portion of the inner end face of 77 comes into engagement with the face of the spring, the spring, at this stage being, approximately, only slightly relieved, will tend, and, in fact, may be strong enough so to do, lift the member 34f to a position of approximately the 90 degree position in which the member 34f serves merely as a brush hanging-hook member and, since the short flat face of the inner end face of 77 is inclined in the opposite direction to the curved portion of the face, the spring, by bearing against the short, flat face portion, serves to hold 34f in the approximate 90 degree position securely enough to require the user, when he picks up the brush for use, to push 34f back towards its seat in the block until the spring begins to act on the inclined curved face and returns 34f to its seat in the block. In manufacture, member 34f is formed from a straight steel bar of square cross-section throughout its length and, intermediate its ends is given a right angle bend at a predetermined region whereby portion 77 and portion 78 will have predetermined lengths and whereby the distance from the pivot pin hole of the bar to the outer face of the bend of the bar will be greater, by an amount equal to approximately one-half the thickness of the bar, than the distance from the pin hole of the block to the side face of the block so as to cause the bent bar to project at its bend beyond the side face of the block; between the bend and an end, the bar is reduced in thickness from its outer face to approximately one-half its original thickness to provide the relatively and uniformly thinner portion of 78 adjacent to which the outer face of the bend is flattened off for a short distance substantially tangential to the curved outer face of the bend. A series of transverse cuts 84 extending from the curve face of the bar towards the thin portion 78 serve to minimize slip on the member 34f of the user's thumb or forefinger in pushing or pulling frictionally the member to the desired elevation; in instances where the user so desires, he may insert his thumb and a finger into the concavely curved recess 56f to engage beneath 77 and lift 34f to the desired elevation. As will be noted upon particular reference to Fig. 27, the pivot pin hole extends only partially through the block and after the shorter pivot pin 79 is driven home, the outer end of the hole is preferably plugged by any suitable material 85 to keep the pin in position and invisible in the handle. In Fig. 29, the brush hangs on the shelf 52f, bristles down; in Fig. 30, the brush hangs, bristles down, clamped to the shelf with the clamping-hook member elevated to an angle of approximately 60 degrees.

For simplicity or economy or avoidance of metal parts, especially in a period of a shortage of or restricted use of metal for the civilian economy, the brush may be presented in the form shown in Figs. 31, 32 and 33 in which the shaving brush is provided with a conically shaped handle, tapered, externally, in the direction of the bristles which are set in the small end of the handle in the manner heretofore described and which may, in some instances, be set or secured in the handle in any other well known manner. From the outer end of the handle, a brush hanging-hook 89 projects longitudinally and, in this instance, is shown to be integral with the handle and stationary relatively thereto and tapered substantially symmetrically with the handle. The outer end face of the handle is longitudinally spaced from the hanging face of the brush hanging-hook by a slot or shelf edge receiving opening 88 which extends from one side of the brush transversely perpendicular to and through the axis of the brush. The outer end of the hanging-hook is provided with a peripheral flange or bead 90 and the outer end face 91 of the hanging-hook is flat and serves as the stand-up-on end face of the brush upon which the latter may be stood, bristles up, upon the shelf 52g and with its axis substantially perpendicular thereto, as shown in Fig. 31. This brush may, also, be stood, bristles up, on the shelf with the edge of the shelf engaged into the slot or the shelf receiving opening in the manner shown in Fig. 32 and may be hung on the shelf, bristles down, with the hanging face of the hanging-hook engaged on the top face of the shelf, as shown in Fig. 33. This brush may be made in this shape by machine turning a rod or block of wood or plastic material and transversely slotting it before or after turning, or by molding to provide a longitudinal bore and the handle outer end plugged flush with opening 88 and the outer end of the hanging-hook provided with a plug having a peripheral flange or bead similar to the flange or bead 90.

It will be noted that, in all instances shown herein, by virtue of the construction of the shelf-engaging face of the brush hanging-hook, the brush may be hung, bristles down, on the shelf, steady and free of swings or oscillations to interfere with any objects which may be on or be below the shelf or to scatter any drippings from a wet formation of bristles over areas other than the localized area directly beneath a steady brush.

It will be obvious that the brushes shown in Figs. 5, 13, 19-22, 24 and 30 may, also, be reversely positioned and clamped to the shelf, that is, clamped to the shelf, bristles up, with the brush hanging-hook cooperating with the flat, outer end face of the handle to clamp the brush in a steady position to the shelf.

In the drawing, similar reference characters refer to similar or corresponding parts throughout the several views.

In using the word "bristles" in the claims, I wish it to be understood in the broad sense as connoting natural or synthetic filaments or a mixture thereof of any suitable material for use in an instrument commonly known and referred to as a brush.

It is possible to produce still other embodiments of the invention than those given for the purpose of illustrating how to attain the objects of this invention and, therefore, it is desired that only such limitations shall be imposed on the appended claims as are set forth therein, or required by the prior art.

The expressions stand-up-on end face and stand-up face as used herein refer to an end face of the brush on which the brush may be stood on a flat surface.

Having described the invention, what I claim as new, and desire to secure by United States Letters Patent is:

1. A brush having a straight longitudinal main axis of symmetry passing substantially through the center of gravity of the brush, said brush being adapted to be hung on a shelf of a cabinet having a closable door closed closely adjacent to the shelf, said brush comprising a handle longitudinal to and symmetrical to said axis and having sides therearound and carrying a stand-up face on one end substantially on all sides of said axis and extending laterally in a plane perpendicular to said axis far enough to allow the handle to be stood in stable equilibrium with said stand-up face on a flat surface; said stand-up end face being of a size adapted to be received within and against the palm of the hand during manipulation; the handle carrying at the other end a substantially longitudinal set of bristles substantially coaxial with said axis and pointing away from the handle; said handle carrying a hook having a laterally open part near one side of the handle and a laterally closed part near the opposite side of the handle entirely remote from said axis, the hook being adapted and constructed to be interiorly and laterally unobstructed and open except at said closed part, said hook having a supporting part having an interior supporting face on the hook facing toward the bristles and disposed substantially in a plane substantially perpendicular to said axis and intersecting the axis and extending to said closed part and said open side and substantially from side to side of the handle; whereby when said door is open or closed almost in contact with the shelf said brush may be hung with said axis passing vertically through the shelf remote from the edge thereof, and with said interior supporting face engaging on said shelf substantially from side to side of the brush and cooperating with the brush and bristles to hold the brush under the shelf with the set of bristles substantially hanging.

2. A brush as in claim 1 said hook having a structural part between the bristles and said supporting part extending parallel to and spaced from and facing toward said supporting part and from said axis to said closed part remote from the axis, the space between the structural part and said supporting part being unobstructed.

3. A brush as in claim 1, said handle having an additional stand-up face perpendicular to said axis facing and spaced from said interior supporting face and extending in a plane perpendicular to said axis to all sides of the handle except at said closed part.

4. A brush as in claim 1 the end of said closed part most remote from said supporting face being pivoted to said handle, near said stand-up face and one side of the handle, on a pivot axis substantially transverse to a plane passing through to said main axis; said handle being provided adjacent to a side and said stand-up faces with channels in said last named plane positioned and adapted to receive said closed and supporting parts when the hook is pivotally moved into said channels.

5. A shaving brush adapted to be hung on a shelf of a cabinet having a closable door closed closely adjacent to the shelf, said brush having from end to end a straight longitudinal main axis of symmetry passing through the center of gravity of the brush, said brush comprising an elongated handle longitudinal and symmetrical to said axis and having sides therearound and carrying at one end a substantially longitudinal set of bristles substantially coaxial with said handle and brush and pointing away from the handle and at the other end a stand-up end face substantially symmetrical to said axis and extending substantially to the sides of the handle substantially in a plane perpendicular to said axis for standing the handle in stable equilibrium with the stand-up face on a flat level surface; said handle having an axial bore having an intermediate constricted portion forming a shoulder faced toward the bristles, a larger diameter portion extending from the constricted portion to near the bristles, and a slot-like portion extending from the constricted portion and substantially radially from said axis and through the outer end face of the handle and having closely spaced side walls, and a longitudinal wall face near a side face of the handle and remote from and substantially parallel to said axis; a stiff supporting arm member slidable in said constricted portion and extending into said larger diameter portion and having an outer portion bent to form a hook having a part extending radially from said axis at said constricted portion and a longitudinal portion parallel to and remote from said axis slidably engaging said closely spaced side walls near said wall face to prevent turning of the arm member in the handle, the longitudinal portion extending substantially to said end face of the handle and having an extension disposed diametrically across the handle adjacent said end face substantially from side to side of the end face and substantially perpendicular to the axis; a spring-retaining member on the inner end of the arm member in said larger diameter portion; and a helical spring around the arm member between said spring-retaining member and shoulder to yieldably hold said extension adjacent to said end face.

6. A brush adapted to be hung on a shelf of a cabinet having a closable door closed closely adjacent to the shelf, said brush having from end to end a straight longitudinal main axis of symmetry passing through the center of gravity of the brush, said brush comprising an elongated handle longitudinal and symmetrical to said axis and having sides therearound and carrying at one end a substantially longitudinal set of bristles substantially coaxial with said handle and brush and pointing away from the handle, and at the other end a stand-up end face substantially symmetrical to said axis and extending to the sides of the handle substantially in a plane perpendicular to said axis for standing the handle in stable equilibrium with the stand-up face on a flat level surface; said handle having an axial bore having an intermediate constricted portion forming a shoulder faced toward the bristles, a relatively wider portion extending from the constricted portion and having a larger diameter end near the bristles, and a large rectangularly shaped slot-like portion extending from the constricted portion and radially from said axis and through the outer end of the handle and having closely spaced side walls, and a longitudinal wall face near a side face of the handle remote from and parallel to said axis; a thin stiff supporting arm member of thin elongated rectangular cross section and having narrow and wide faces and slidably fitted in said constricted portion and extending into said larger diameter portion and having an outer portion bent to form a hook having a radial part extending radially from said axis at said constricted portion and a longitudinal portion remote from said axis and having its narrow edges substantailly slidably engaging said side walls, said longitudinal portion extending substantially to said end face of the handle and carrying an extension part disposed diametrically across said end face substantially parallel with and spaced from said radial part and extending substantially from side to side of said end face, with a wide face of the extension part substantially perpendicular to the axis; a guide member on the inner end of the arm member and slidably fitted in said larger diameter portion and adapted to be guided coaxially with said axis by the wall of said wider portion and to guide the arm member coaxially with said axis; and yieldable means to yieldably hold said extension part adjacent to said end face, and adapted to hold approximately all parts of said stand-up end face in engagement with said shelf on all sides of said axis remote from the axis to give first support to the brush on the shelf.

7. A brush as in claim 6, in which said guide member is in the form of a washer and said yieldable means comprises a helical wire spring on said arm member compressed between the washer and said shoulder and having convolutions of uniform diameter at least as small in diameter as the washer and adapted to contact each other when the spring is fully compressed, said spring yieldably holding said extension adjacent to said end face, and allowing the extension to be spaced from the handle and to be disposed over the shelf with said axis passing through the shelf remote from the edge of the shelf, and to grip the shelf and suspend the handle beneath the shelf, for draining and drying the bristles, with said thin longitudinal portion adjacent to the shelf to allow the cabinet door to close very close to the shelf; said spring when fully compressed being of a length to stop outward movement of said radial and longitudinal portions from leaving said slot-like portion; whereby said radial and longitudinal portions are at all times held from leaving said slot-like portion, and maintain said extension diametric to the brush independently of the shelf.

8. A shaving brush as in claim 6, said extension part being thin enough to allow small narrow bottles to rest partly on the extension and partly on the shelf without being upset.

9. A brush as in claim 6 in which said stand-up end face is of small diameter and is provided with a finger-receiving recess disposed across said axis, and said extension comprises a strip disposed diametrically across said axis and recess from side to side of the axis, said extension being disposed across and on said axis to allow easy access of the thumb and finger for withdrawing the hook.

10. A brush as in claim 6, in which said thin extension carries a flat-bottom, bore-closure plate disposable against the adjacent end of the handle.

11. A brush as in claim 6 said handle comprising separable end portions dividing the handle across said larger diameter of the bore, and having a screw thread connection, and giving access to said guide member.

12. An article of manufacture having from end to end a straight longitudinal main axis of symmetry, said article comprising an elongated handle longitudinal and symmetrical to said axis and having sides therearound and carrying at one end a stand-up end face substantially symmetrical to said axis and extending to the sides of the handle substantially in a single plane perpendicular to said axis for standing the handle in stable equilibrium with the stand-up face on a flat level surface; said handle having an axial bore having an intermediate constricted portion of thin rectangular cross section forming a shoulder faced in a direction away from said end face, a larger diameter portion extending from the constricted portion away from the end face, and a large rectangularly shaped slot-like portion extending from the constricted portion and radially from said axis and through the outer end face of the handle and having closely spaced side walls, and a longitudinal wall face adjacent to a side face of the handle and remote from and parallel to said axis; a thin stiff supporting arm member of thin elongated rectangular cross section and having narrow and wide faces and slidably fitted in said constricted portion and adapted to extend to said larger diameter portion and having an outer portion bent to form a hook having a radial part extending radially from said axis at said constricted portion and a longitudinal portion remote from said axis and having its narrow edges substantially slidably engaging said spaced side walls and one of its wide faces substantially slidably engaging said wall face, said longitudinal portion extending substantially to said end face of the handle and carrying an extension part disposed diametrically across said axis and end face substantially from side to side of said end face, with a wide face of said extension part substantially perpendicular to and crossing said axis, a washer on the inner end of the arm member and slidably fitted in said larger diameter portion and adapted to be guided coaxially with said axis by the wall of the cylindrical portion and to guide the arm member coaxially with said axis; and a helical wire spring member compressed between said shoulder and washer to yieldably hold said extension in an inner position adjacent to said end face.

13. A brush as in claim 12 in which said stand-up end is about half as wide as the palm of a person's hand, and is provided with a deeply concaved recess, and said extension comprises a thin strip disposed diametrically across the recess, when in said inner position, and has a free end engageable with a marginal face of the recess on the side opposite said longitudinal portion, said strip substantially from end to end and at said axis being spaced from the bottom of the recess and the space at said axis and between said bottom and strip being unobstructed to allow easy access of the thumb and finger to said space for lifting the strip from the recess and withdrawing the hook from the handle.

14. A shaving brush having a straight longitudinal main axis of symmetry passing substantially through the center of gravity of the brush, and adapted to be hung on a shelf of a cabinet having a closable door closed closely adjacent to the shelf, said brush comprising an elongated handle longitudinal to and symmetrical to said axis and having sides therearound and carrying a stand-up face on one end substantially on all sides of, and symmetrical to said axis and extending laterally in a plane perpendicular to said axis far enough to allow the handle to be stood in stable equilibrium with said stand-up face on a flat surface; said stand-up face being less wide than substantially half the width of the palm of the hand; the handle carrying at the other end a substantially longitudinal set of bristles pointing away from the handle; the handle and set being coaxial with said axis; said handle yieldably movably carrying a hook having a closed part near one side of the handle normally remote from said axis and constructed to be interiorly and laterally unobstructed and open except at said closed part, said hook having an interior supporting face on the hook facing toward the bristles and disposed across said axis; said hook being movable to a position fully exposing said stand-up face for standing the brush with said stand-up face on a flat surface.

15. A brush adapted and constructed to be manually manipulated or hung on a wall hook or shelf hook or clamped, in hanging down position, to an external support, such as a shelf or the like, and having a longitudinal axis and including a handle longitudinal with and substantially symmetrical to said axis, the handle having an outer end provided with a recess open at said end and through which recess said axis passes, the handle having a set of bristles longitudinally spaced from said outer end, the handle carrying a longitudinally adjustable rod having a longitudinal portion remote from said axis and provided on its outer end with a supporting portion extending in said recess transversely of said axis and spaced inwardly from opposite side walls of said recess and cooperative with the outer end of the handle for clamping the brush in the hanging down position to said external support, said supporting portion having an inner face extending, spaced from the bottom of the recess, lengthwise from within one half-side of the handle into the opposite half-side thereof, whereby the wall hook or shelf hook or the user's finger tips may engage into the recess on opposite sides of said supporting portion and beneath the inner face thereof and engage said supporting portion, yieldable means engaging said adjustable rod and said handle and yieldably holding said supporting portion in said recess and to permit said supporting portion to be longitudinally spaced from said outer end of the handle whereby said external support may be received between said inner face of the supporting portion and the outer end of said handle and opposite both of said half-sides of the handle, and means in the handle for guiding said adjustable rod, whereby said supporting portion thereof will at all times be guided back into said recess when released from said external support.

16. A brush adapted and constructed to be manually manipulated or hung on a wall hook or shelf hook or clamped, in hanging down position, to an external support, such as a shelf or the like, and having a longitudinal axis and including a handle longitudinal with and substantially symmetrical to said axis, the handle having an outer end provided with a recess open at said end and through which recess said axis passes the handle having a set of bristles longitudinally spaced from said outer end, the handle carrying a longitudinally adjustable rod having a longitudinal portion remote from said axis and provided on its outer end with a supporting portion extending in said recess transversely of said axis and spaced inwardly from opposite side walls of said recess and cooperative with the outer end of the handle for clamping the brush, in the hanging down position, to said external support, said supporting portion having an inner face intersecting said axis from opposite sides thereof and spaced from the bottom of the recess at and at said opposite sides of its intersection with said axis, whereby the wall hook or shelf hook or the user's finger tips may engage into the recess on opposite sides of said supporting portion and beneath the inner face thereof and engage said supporting portion, yieldable means engaging said adjustable rod and said handle and yieldably holding said supporting portion in said recess and to permit said supporting portion to be longitudinally spaced from said outer end of the handle whereby said external support may be received between said inner face of the supporting portion and the outer end of the handle and intersect said axis, and means in the handle for guiding said adjustable rod, whereby said supporting portion thereof will at all times be guided back into said recess when released from said external support.

17. A brush adapted and constructed to be clamped to an external support, such as a shelf or the like, to hang the brush, bristles down, and including a handle having a longitudinal axis and an outer clamping end and a longitudinal bore extending inwardly from said clamping end, a formation of bristles carried by the inner end of the handle, a longitudinally adjustable clamping rod mounted in the handle longitudinally movable in said bore and having a longitudinal portion disposed between said axis and one side of the handle, said longitudinal portion remote from the axis and carrying at its outer end a supporting portion adjacent the outer end of the handle and extending transversely in the direction towards the opposite side of the handle and terminating in a free end, said supporting portion being cooperative with said clamping end of the handle for clamping the brush to the external support, the inner face of said supporting portion extending from between said axis and said one side of the handle in the direction towards said opposite side of the handle and toward said free end of the supporting portion whereby the external support may be received between said clamping end of the handle and said inner face of said supporting portion and intersect said axis when said supporting portion is moved longitudinally outwardly spaced from the clamping end of the handle, yieldable means in the handle yieldably holding said supporting portion adjacent said clamping end of the handle and to permit said supporting portion to be longitudinally outwardly spaced from the clamping end of the handle, and means in the handle cooperative with the adjustable clamping rod for preventing said supporting portion from rotating relative to said outer end of the handle.

18. A brush adapted and constructed to be clamped to an external support, such as a shelf or the like, to hang the brush, bristles down, and including a handle having a longitudinal axis and a longitudinal bore extending inwardly from said clamping end, a formation of bristles carried by the inner end of the handle, a longitudinally adjustable clamping rod mounted in the handle longitudinally movable in said bore and having a longitudinal portion remote from the axis and disposed between said axis and one side of the handle, the longitudinal portion carrying at its outer end a supporting portion adjacent the outer end of the handle and extending transversely in the direction towards the opposite side of the handle and terminating in a free end, said supporting portion being cooperative with said clamping end of the handle for clamping the brush to the external support, the inner face of said supporting portion extending from between said axis and said one side of the handle in the direction towards said opposite side of the handle and towards said free end of the supporting portion whereby the external support may be received between said clamping end of the handle and the inner face of said supporting portion and intersect said axis when said supporting portion is moved longitudinally outwardly spaced from the clamping end of the handle, said supporting portion being in the form of a bore-closure plate extending to all sides of the handle, and yieldable means in the handle engaging said adjustable rod and yieldably holding said supporting portion adjacent said clamping end of the handle for closing the outer end of said bore and to permit said supporting portion to be longitudinally outwardly spaced from the clamping end of the handle.

19. A brush as claimed in claim 18 and with the brush having a main axis of symmetry coaxial with the handle and passing through the center of gravity of the brush, and the outer face of the supporting portion of the adjustable rod being a stand-up face whereby the brush may be stood up on the outer face of said bore-closure plate.

20. A shaving brush having a straight longitudinal main axis of symmetry passing substantially through the center of gravity of the brush, and adapted to be hung on a shelf of a cabinet having a closeable door closed closely adjacent to the shelf, said brush comprising a handle longitudinal to and symmetrical to said axis and having sides therearound and carrying a stand-up face on one end substantially on all sides of, and symmetrical to, said axis and extending laterally in a plane perpendicular to said axis far enough to allow the handle to be stood in stable equilibrium with said stand-up face on a flat surface; the handle carrying at the other end a substantially longitudinal set of bristles pointing away from the handle; the handle and set of bristles being coaxial with said axis; said handle movably carrying a hook having a closed part normally remote from said axis and relatively nearer to one side of the handle than to the opposite side thereof and constructed to be interiorly and laterally unobstructed and open except at said closed part; said hook having a supporting end provided with an interior supporting face facing substantially in the direction in which the bristles point, the supporting end of said hook extending from said closed part thereof in the direction transverse of the handle for extending oppositely away from the cabinet door when said door is closed closely adjacent said shelf and for hanging the brush on the shelf with the latter intersecting the axis of the brush; said hook being movable to a position fully exposing said stand-up face for standing the brush with said stand-up face on a flat surface.

21. A shaving brush as claimed in claim 20, and with said handle yieldably movably carrying said hook.

(References on following page)

References Cited in the file of this patent

UNITED STATES PATENTS

| | | |
|---|---|---|
| 1,360,989 | Potstada | Nov. 30, 1920 |
| 1,458,408 | Hawtin | June 12, 1923 |
| 1,580,788 | Lingard | Apr. 13, 1926 |
| 1,659,622 | Atamian | Feb. 21, 1928 |
| 1,686,551 | Carmichael | Oct. 9, 1928 |
| 1,710,069 | Potstada | Apr. 23, 1929 |
| 2,411,421 | Golden | Nov. 19, 1946 |

FOREIGN PATENTS

| | | |
|---|---|---|
| 206,399 | Switzerland | Nov. 1, 1939 |
| 659,965 | Germany | of 1938 |
| 774,430 | France | Sept. 17, 1934 |

UNITED STATES PATENT OFFICE

CERTIFICATE OF CORRECTION

Patent No. 2,799,036                      July 16, 1957

John T. Scully

It is hereby certified that error appears in the printed specification of the above numbered patent requiring correction and that the said Letters Patent should read as corrected below.

Column 12, line 74, for "first" read -- firm --; column 15, line 13, after "passes" insert a comma; lines 52 and 53, strike out "remote from the axis and" and insert the same after "portion" and before "disposed" in line 51, same column.

Signed and sealed this 22nd day of October 1957.

(SEAL)
Attest:

KARL H. AXLINE
Attesting Officer

ROBERT C. WATSON
Commissioner of Patents